United States Patent [19]

Folkestad et al.

[11] 3,855,392

[45] Dec. 17, 1974

[54] METHOD OF REMOVING BORIC ACID AND BORIC ACID SALTS FROM AQUEOUS MAGNESIUM CHLORIDE SOLUTIONS

[75] Inventors: Finn Enok Folkestad, Heistad, Norway; Kjell Olav Loiten; Glor Thorvald Mejdell; Asbjorn Torvund, all of Porsgrunn, Norway

[73] Assignee: Norsk Hydro a.s., Oslo, Norway

[22] Filed: Sept. 24, 1971

[21] Appl. No.: 183,683

[30] Foreign Application Priority Data

Sept. 29, 1970  Norway............................ 3686/70

[52] U.S. Cl.................. 423/497, 423/283, 423/157
[51] Int. Cl....................... C01b 35/00, B01d 11/04
[58] Field of Search........... 23/312 R; 423/157, 283, 423/497, 498

[56] References Cited
UNITED STATES PATENTS

| 3,493,349 | 2/1970 | Schiappa........................... 23/312 R |
| 3,433,604 | 3/1969 | Grinstead.......................... 23/312 R |
| 2,969,275 | 1/1961 | Garrett............................. 23/312 R |
| 3,424,563 | 1/1969 | Grinstead.......................... 23/312 R |
| 2,855,294 | 10/1958 | Tribalat........................... 23/312 R |

FOREIGN PATENTS OR APPLICATIONS 910,541  11/1962  Great Britain.................... 23/312 R

OTHER PUBLICATIONS

Barson, Nuclear Science Abstracts, Vol. 6, No. 20, Oct. 31, 1952, p. 707 (No. 5758).

Nelson, Quarterly Prog. Report, March 31, 1953, TI-D-10143, "Liquid-Liq. Extrac. of Boric Acid Using Aliphatic Alcohols," pp. 24-34.

*Primary Examiner*—Norman Yudkoff
*Assistant Examiner*—J. J. Emery
*Attorney, Agent, or Firm*—Wenderoth, Lind & Ponack

[57] ABSTRACT

This invention relates to a process of removing boric acid and salts thereof from an aqueous magnesium chloride solution intended to be used for the electrolytic production of magnesium. The removing of said substances is carried out by liquid-liquid extraction using an organic extractant, followed by re-extraction of boron from the organic phase. As extractant is employed at least one univalent aliphatic alcohol having 7 to 12 carbon atoms in the molecule diluted with a suitable hydrocarbon solvent, the extraction being effected at a pH not above 7, while the subsequent re-extraction of boron from the organic phase is effected at a pH not below 7.

7 Claims, No Drawings

METHOD OF REMOVING BORIC ACID AND BORIC ACID SALTS FROM AQUEOUS MAGNESIUM CHLORIDE SOLUTIONS

This invention relates to a method of purifying aqueous magnesium chloride solutions, and more particularly it relates to a method of removing boric acid and salts thereof from such solutions by liquid-liquid extraction.

Magnesiusm chloride intended to be used for the electrolytic production of magnesium should, preferably, contain only a minimum of boric acid and salts thereof. It is well known that the presence of even a small amount of boron in the electrolyte is capable of impairing the current efficiency considerably. The natural salt deposits containing magnesium chloride and the commercial magnesium chloride solutions obtained therefrom normally contain boric acid and/or salts thereof in such an amount that most of it must be removed when the magnesium chloride is to be used for the molten salt electrolytic production of magnesium.

It is known to remove borates from alkaline, aqueous salt solutions by liquid-liquid extraction by means of aliphatic diols and polyols containing from 6 to 16 carbon atoms in the chain. In this method it is known to employ a solvent, for instance petrol ether, for the diol or the polyol.

Further, it is known to extract boric acid from magnesium chloride solutions by means of univalent aliphatic alcohols containing from 4 to 12 carbon atoms in the molecule.

From the Norwegian Pat. No. 112,066 there is known a method of removing and recovering calcium and boron values by means of liquid-liquid extraction from aqueous magnesium chloride solutions, in which extraction is effected at a pH value not higher than 6 by means of an organic extractant consisting of or containing one or more aliphatic vicinal diols and alkyl, alkoxy or halogen substituted catechols. The organic extractant can contain an aliphatic alcohol, according to the examples of the patent up to 7.5% by weight of n-octanol, and a solvent for the diol and/or the substituted catechol.

The known processes for the extraction of boron from aqueous magnesium chloride solutions entail too great a loss of organic extractant or an elaborate and expensive regeneration thereof due to the fact that the water solubility of polyvalent alcohols, also on dilution with organic solvents, as well as that of the pure fatty alcohols, is too high.

The present invention is based on the discovery that the abovementioned drawbacks can be avoided by using a mixture of univalent aliphatic alcohols having from 7 to 12 carbon atoms in the molecule with hydrocarbon solvents to reduce the solubility of the alcohol in the aqueous salt solution and in the regenerating liquid, and to reduce the solubility of water and $MgCl_2$ in the organic extractant. Surprisingly, we have found that the extraction ability of such a mixture containing only 5–20% by volume of fatty alcohol was not substantially inferior to that of the pure fatty alcohol, so that the mixture was entirely suitable for the extraction of boron from concentrated salt solutions, having a content of $MgCl_2$ of for instance about 400 g $MgCl_2$ per litre, when the solution was acidic, preferably at a pH of 2–4. According to further aspect of the method of the invention the boron compounds, contrary to what is recommended and used conventionally are re-extracted from the organic phase at an alkaline pH, preferably a pH of 8–10.

According to the invention there is preferably employed as extractant 2-ethyl hexanol in petrol ether, or iso-octanol in petrol ether. "Iso-octanol" as used according to the invention actually is a mixture consisting substantially of dimethyl substituted hexanols. Mixtures of fatty alcohols having 7, 8, and 9 carbon atoms in the molecule can be used successfully as well.

The preferred ratio of petrol ether to fatty alcohol is 4 to 9 parts by volume of petrol ether to one part of fatty alcohol.

The method of the invention is defined in the appending claims.

By means of the method of the invention, the drawbacks mentioned above are eliminated or reduced, and the small amounts of organic materials that are lost consist of relatively inexpensive substances.

The method of the invention will now be further explained and elucidated by means of examples. The tests were carried out using magnesium chloride solutions containing substantially $MgCl_2$ and minor amounts of KCl, NaCl and $CaCl_2$.

Table 1 comprises tests in which iso-octanol was diluted with petrol ether in varying ratios, the mixtures being used to extract boron from an aqueous salt solution containing 394 g $MgCl_2$ per litre. The coefficient of distribution is given in the column to the right. It will be seen that its highest value was obtained using a 50—50 mixture of iso-octanol and petrol ether. It will also be noted, however, that the coefficient of distribution is as high as 3.8 for 20% iso-octanol in petrol ether compared to 4.3 for 100% iso-octanol.

Table 2 comprises tests wherein iso-octanol diluted with petrol ether in a certain ratio was used to extract boron from aqueous solutions containing $MgCl_2$ in varying concentrations. It will be seen that the coefficient of distribution increases with increasing concentration of $MgCl_2$ in the solution.

Table 3 comprises tests showing the coefficient of distribution for a number of extractants (fatty alcohols diluted with organic solvents) when used to extract boron from aqueous solutions containing 450 g $MgCl_2$ per litre. The "Alphanol" used is a mixture of $C_7$, $C_8$ and $C_9$ fatty alcohols in a ratio of 40/43/17 molar %. It

TABLE 1

Iso-octanol in petrol ether in varying ratios

| Test no. | ml $MgCl_2$ solution | g $MgCl_2$ per litre | ml iso-octanol | ml petrol ether | ppm B in organic phase | ppm B in aqueous phase | ppm B in organic phase | ppm B in aqueous phase |
|---|---|---|---|---|---|---|---|---|
| 1 | 50 | 394 | 50 | 0 | 210 | 49 | | 4.3 |
| 2 | 50 | 394 | 25 | 25 | 210 | 41 | | 5.1 |
| 3 | 50 | 394 | 10 | 40 | 200 | 58 | | 3.8 |
| 4 | 50 | 394 | 5 | 45 | 185 | 61.5 | | 3.0 | was found that the diluent considerably affects the ability of the fatty alcohol to extract boron from aqueous magnesium chloride solutions, see tests No. 1, 4 and 5, and that petrol ether provides a considerably better extraction ability than do the aromatic diluents toluene and xylene. Also surprising is the fact that 2-ethyl hexanol in petrol ether turned out to be an excellent extractant.

Table 4 relates to a test series in which varying amounts of concentrated hydrochloric acid were added to to aqueous solutions containing 450 g $MgCl_2$ per litre. The table shows the coefficient of distribution as a function of the acidity of the aqueous solution, in the boron extraction using 10% by volume of iso-octanol in petrol ether. In all of these tests, pH was between 2 and 6, as measured on dilution to a $MgCl_2$ concentration of 240 g per litre. The highest value of the coefficient of distribution was obtained when adding 0.55 ml of 12.58 N HCl per 100 ml of chloride solution, corresponding to a pH value of about 4.

TABLE 5

Regeneration of organic extractant by means of 150 ml of water containing varying amounts of aqueous sodium hydroxide added thereto.
Organic phase/aqueous phase = 10:1

| | Aqueous NaOH added | | | Residual boron in organic phase | | Boron in aqueous phase | |
|---|---|---|---|---|---|---|---|
| 1 | 7.5 | ml | conc. | 0 | mg/l | 1220 | mg/l |
| 2 | 15 | do. | 0.75 N | 0 | do. | 1260 | do. |
| 3 | 15 | do. | 0.60 N | 0.2 do. | | 1230 | do. |
| 4 | 15 | do. | 0.50 N | 0.5 do. | | 1220 | do. |
| 5 | 15 | do. | 0.25 N | 1.0 do. | | 1250 | do. |
| 6 | 15 | do. | 0.15 N | 4 | do. | 990 | do. |
| 7 | 15 | do. | 0.10 N | 23 | do. | 950 | do. |
| 8 | 15 | do. | 0.05 N | 42 | do. | 700 | do. |

TABLE 2

Aqueous solutions having varying $MgCl_2$ content

| Test no. | ml $MgCl_2$ solution | g $MgCl_2$ per litre | ml iso-octanol | ml petrol ether | ppm B in organic phase | ppm B in aqueous phase | ppm B in organic phase | ppm B in aqueous phase |
|---|---|---|---|---|---|---|---|---|
| 1 | 50 | 475 | 10 | 40 | 260 | 21 | | 12.4 |
| 2 | 50 | 450 | 10 | 40 | 230 | 28.5 | | 8.1 |
| 3 | 50 | 415 | 10 | 40 | 200 | 39.5 | | 5.1 |
| 4 | 50 | 394 | 10 | 40 | 200 | 53.— | | 3.8 |
| 5 | 50 | 365 | 10 | 40 | 135 | 59 | | 2.3 |
| 6 | 50 | 306 | 10 | 40 | 90 | 71 | | 1.2 |

TABLE 3

Coefficient of distribution for various extractants

| Test no. | ml $MgCl_2$ solution | g $MgCl_2$ per litre | Composition of extractant | | | | Temperature °C | ppm B in organic phase | ppm B in aqueous phase |
|---|---|---|---|---|---|---|---|---|---|
| | | | ml | fatty alcohol | ml | diluent | | | |
| 1 | 100 | 450 | 10 | iso-$C_8$ | 90 | petrol ether | 22 | 5.70 | |
| 2 | 100 | 450 | 50 | do. | 50 | do. | 22 | 8.95 | |
| 3 | 100 | 450 | 10 | do. | 90 | do. | 45 | 3.57 | |
| 4 | 100 | 450 | 10 | do. | 90 | toluene | 22 | 2.14 | |
| 5 | 100 | 450 | 10 | do. | 90 | m-xylene | 22 | 2.— | |
| 6 | 100 | 450 | 10 | lauryl | 90 | petrol ether | 22 | 4.25 | |
| 7 | 100 | 450 | 10 | do. | 90 | do. | 45 | 1.25 | |
| 8 | 100 | 450 | 10 | do. | 90 | toluene | 22 | 1.— | |
| 9 | 100 | 450 | 10 | do. | 90 | m-xylene | 22 | 1.25 | |
| 10 | 100 | 450 | 10 | iso-$C_9$ | 90 | petrol ether | 22 | 3.7 | |
| 11 | 100 | 450 | 10 | 2-ethyl-) hexanol ) | 90 | do. | 22 | 6.1 | |
| 12 | 100 | 450 | 0 | | 100 | do. | 22 | 0.— | |
| 13 | 100 | 450 | 10 | "Alphanol" | 90 | do. | 22 | 4.1 | |
| 14 | 100 | 450 | 10 | do. | 10 | do. | 22 | 3.9 | |
| 15 | 100 | 450 | 10 | do. | 90 | do. | 22 | 4.0 | |

TABLE 4

The coefficient of distribution as a function of the acidity of the aqueous $MgCl_2$ solution

| | ml 12.58 N HCl per 100 ml solution | Coefficient % distribution |
|---|---|---|
| 1 | 0.04 | 0.8 |
| 2 | 0.15 | 3.2 |
| 3 | 0.35 | 4.3 |
| 4 | 0.50 | 4.5 |
| 5 | 0.75 | 4.4 |
| 6 | 1.50 | 3.8 |
| 7 | 3.00 | 3.3 |

Table 5 comprises tests wherein the separated organic phase, i.e., the extractant with its boron content, was treated with alkaline water to re-extract boron from the organic phase, whereby the latter can be used over again. In these tests, the alkalinity is varied. The tests shows that the re-extraction was by far more efficient at relatively high alkalinity than at low alkalinity.

The loss of material is very low using the method of the invention. Tests were carried out on a pilot plant scale comprising a continuous 4-stage extraction of boron from an aqueous solution containing 400 g of $MgCl_2$ per litre by means of an equal volume of 10% iso-octanol in petrol ether, followed by a 3-stage regeneration of the organic phase by means of 0.02 N aqueous sodium hydroxide, the volume ratio of organic phase to aqueous sodium hydroxide being 6:1. The loss of organic phase was found to be 0.02 ml per litre of chloride solution treated and 0.2 ml per litre of aqueous sodium hydroxide.

What is claimed is:

1. A method of removing boric acid and salts thereof from an aqueous magnesium chloride solution by liquid-liquid extraction using an organic extractant, followed by re-extraction of boron from the organic phase, consisting essentially of employing as extractant at least one univalent aliphatic alcohol having 7 to 12 carbon atoms in the molecule diluted with petrol ether in the ratio of 1 part by volume of alcohol in 1 to 20 parts by volume of petrol ether, the extraction being effected at a pH not above 7, while the subsequent re-extraction of boron from the organic phase is effected at a pH not below 7.

2. A method as claimed in claim 1, wherein the extraction is effected by means of 2-ethyl hexanol in petrol ether.

3. A method as claimed in claim 1, wherein the extraction is effected by means of iso-octanol in petrol ether.

4. A method as claimed in claim 1, wherein the extraction is effected using the aliphatic alcohol dissolved in petrol ether in the ratio of 1 part by volume of alcohol in 4 to 9 parts by volume of petrol ether.

5. A method as claimed in claim 1, wherein the extraction is effected at a pH of 2 to 4.

6. A method as claimed in claim 1, wherein the re-extraction of boron from the organic phase is effected by means of an alkaline aqueous phase at a pH of 8 to 10.

7. A method as claimed in claim 1, wherein the concentration of $MgCl_2$ in the aqueous solution from which boron is to be removed is adjusted to about 400 g per liter prior to the extraction.

* * * * *